United States Patent
Visser et al.

[11] Patent Number: 5,842,388
[45] Date of Patent: Dec. 1, 1998

[54] VEHICLE HUB AND BRAKE MACHINING METHOD

[75] Inventors: Monte J. Visser, Grosse Pointe Woods; Vince T. Mastrangelo; P. William McCay, both of Ann Arbor; Jay K. Julow, Novi, all of Mich.

[73] Assignee: Bosch Braking System, Farmington Hills, Mich.

[21] Appl. No.: 761,971

[22] Filed: Dec. 10, 1996

[51] Int. Cl.⁶ .................................................. B24B 1/00
[52] U.S. Cl. ................................................. 82/1.11; 82/112
[58] Field of Search .......................... 82/1.11, 104, 112, 82/129, 163

[56] References Cited

U.S. PATENT DOCUMENTS

| | | | |
|---|---|---|---|
| 3,555,940 | 1/1971 | Cooper | 82/112 |
| 3,626,226 | 12/1971 | Pauwels et al. | 310/168 |
| 4,493,231 | 1/1985 | Wossner | 82/4 A |
| 5,263,900 | 11/1993 | Stimson | 188/181 A |
| 5,430,926 | 7/1995 | Hartford . | |
| 5,480,007 | 1/1996 | Hartford | 82/1.11 |

*Primary Examiner*—Andrea L. Pitts
*Assistant Examiner*—Mark Williams
*Attorney, Agent, or Firm*—Harness, Dickey & Pierce LLC

[57] ABSTRACT

A method of machining a wheel hub and brake component in which the braking friction surface is machined together with the hub bearing journal and seat while the hub and braking component are mounted to a single work holding tool thus enabling both surfaces to be machined relative to one another with close tolerances. In the case of a two-piece wheel hub and rotor assembly, the rotor is mounted to the hub in a manner which establishes the relative position of the rotor relative to the hub prior to machining the hub and rotor.

14 Claims, 3 Drawing Sheets

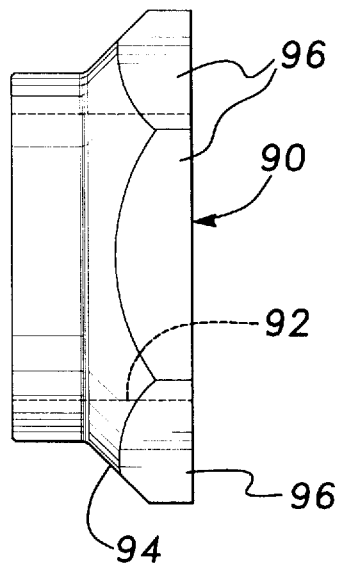
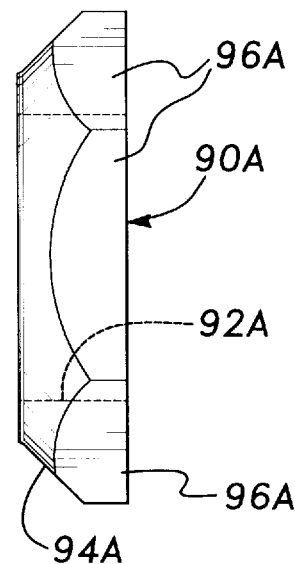
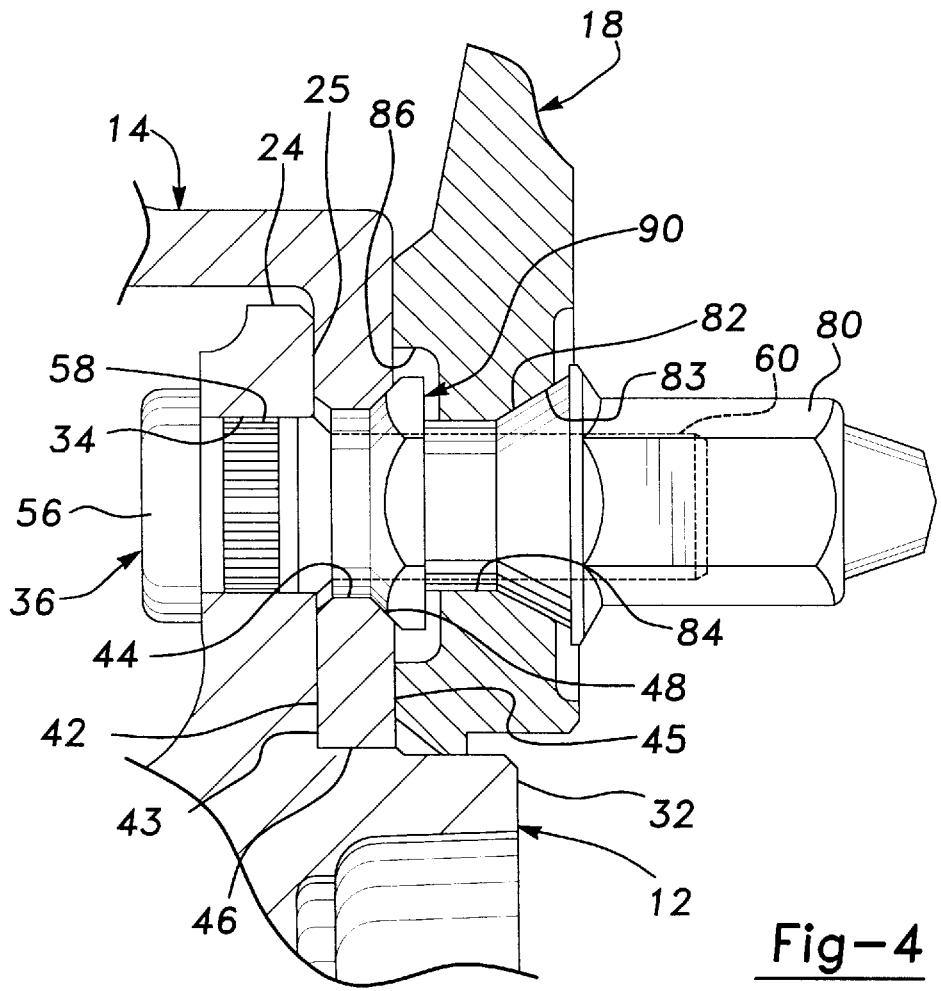

VEHICLE HUB AND BRAKE MACHINING METHOD

BACKGROUND AND SUMMARY OF THE INVENTION

This invention relates to motor vehicle brake rotor wheel end components and particularly to a wheel hub having a brake component such as a disk mounted thereto and for a method of machining the braking friction surfaces of the brake component and the bearing journal and seat.

Most motor vehicles today include disc brake systems for the front axle and many further include disc brakes at the rear axle positions. The disc brake rotor is a circular metal disc having opposed braking surfaces that are clamped by brake pads carried by a brake caliper to exert a braking effect. The wheel hub incorporates an anti-friction wheel bearing assembly in which one race of the bearing is coupled to the vehicle suspension and the other rotationally mounts the brake rotor and wheel. Ordinarily the rotating components of the rotor and hub assembly are manufactured separately and assembled together. This enables the brake rotor to be serviced and replaced if necessary during use. Moreover, the desired material characteristics for a brake rotor and hub components are different. Although efforts to integrate these components have been proposed, such an approach has not found wide-spread acceptance.

In order to enhance performance of the braking system it is desired to carefully and accurately control the dimensional characteristics of the rotor braking surfaces as the rotor rotates. The thickness variation of the disc and the lateral run-out or lateral deflection of the surfaces as they rotate need to be held to minimum tolerances. Similarly, the radial run-out of the outer edges of the braking surfaces need to be controlled to ensure that the brake pads engage as much of the available rotor braking surface as possible without overlapping the edges of the rotor which gives rise to brake noise problems. The desire to control lateral and radial run-out of braking surfaces of a disc rotor are well known. However, manufacturers have faced difficulties in achieving enhanced control over these tolerances due to the influence of several factors.

Presently available manufacturing methods and designs of wheel end assemblies limit the accuracy to which radial and lateral run-out of braking surfaces can be controlled. One approach presently used is to separately finish machine the rotor and wheel hub, and later mate the two. The "stack up" of tolerance variations related to such an approach is significant. This is true not only because the machining operations of the parts are done separately, but in view of the fact that tight control over the relative positioning of the hub and rotor components is not provided. Brake rotors typically have a central hole which mounts over a protruding shoulder or post of the wheel hub. A number of wheel bolts projecting from the hub pass through clearance holes in the rotor. Due to the need to provide clearance between the bolts and associated bolt holes in the rotor, the rotor is not accurately positioned with respect to the hub surface. Slight angular variations in the relative position of these two parts can adversely impact run-out characteristics. Such variations occur in at least two ways. First, the center-to-center alignment of the rotor and hub is not well controlled. Second, the relative angular position or "clocking" of the components is also variable. In addition, the forces acting on the components as they are mounted to the vehicle cannot be readily duplicated during a machining and measurement operation. Thus, differences in deflections of the components between that occurring during machining operations and during use adversely contribute to run-out accuracies.

One approach to improving upon currently available brake rotor run-out accuracies is to assemble a rotor and hub and finish machine the rotor braking surfaces. This is done by employing accurately ground or machined surfaces of the hub as a datum for finishing the rotor braking surfaces. Although an improvement over prior processing, this approach is still limited by the lack of accuracy of control and fixing of the relative angular position of the hub and rotor. Additional variation is incurred due to inaccuracies of locating the hub datum in the workholding device for final machining operations. In this process, sheet metal nuts, such as so called "tinnerman" nuts are often used on the wheel mounting bolts to loosely connect the hub and rotor in an assembled condition. Such fasteners are used since they are thin and do not therefore interfere with the vehicle wheel mounted against the outboard rotor face. This approach however, suffers from some of the same shortcoming of the previously described method in that the relative angular position of the components cannot be assured and clamping loads acting on the parts during use cannot be readily duplicated.

In accordance with this invention, a novel wheel end assembly and a novel method are provided which include special fastening means for connecting the two principle components together for machining operations. The fastening approach accurately controls the relative angular position and center-to-center alignment of the two components and simulates wheel mounting clamping forces. In the novel machining process, these components are fastened together and thereafter the rotor braking surfaces are machined concurrently (or consecutively) with datum surfaces on the hub. The primary datum is the cylindrical outer barrel of the hub which the wheel bearing assembly later mounts to. These retention fasteners are left in position to maintain the relative positions of the components as the wheel is attached, thus completing the bolted joint. Through this method and component design, extreme accuracy over lateral and radial run-out of the braking surfaces is provided.

In this invention, fasteners in the form of retention nuts are threaded onto the wheel mounting bolts and engage the rotor. The rotor and retention nuts define an interface which establishes the relative angular and center-to-center alignment of the hub and rotor. In a preferred embodiment, the nuts feature tapered outer surfaces which engage generally conical counter-bored surfaces of the rotor wheel bolt clearance holes. These fasteners provide a clamping force as well as accurately positioning the relative angular position of the hub and rotor. By maintaining the components in an assembled condition after machining, the relative position of the parts is maintained and thus, precise control over dimensional run-outs is provided.

The novel machining method of the present invention is the machining of the braking friction surface of a wheel hub and brake component together with the machining of the bearing journal and seat on the wheel hub while the wheel hub and brake component are mounted in a single work holding tool.

While the machining method in which the rotor braking surfaces are machined concurrently or consecutive with the hub datum surfaces is particularly beneficial with a two-piece assembled brake rotor, this method can also be employed with a single piece cast hub and rotor. With the single piece cast hub and rotor, the relative angular and center to center alignment of the hub and rotor are fixed. The advantage of the machining method is the formation of both the hub datum surfaces simultaneous with the finishing of the rotor braking surfaces with the hub and rotor mounted to a single work holding tool. This enables the location of the braking surface to be better controlled relative to the bearing mounting surface.

Further objects, features and advantages of the invention will become apparent from a consideration of the following description and the appended claims when taken in connection with the accompanying drawings.

BRIEF DESCRIPTION OF THE DRAWINGS

FIG. 3 is an elevational view of the retention nut according to a first embodiment shown in FIG. 1.

FIG. 3A is an elevational view of a modified form of the retention nut shown in FIG. 3.

FIG. 4 is an enlarged view taken from FIG. 1.

DETAILED DESCRIPTION OF THE PREFERRED EMBODIMENTS

Figure 1:
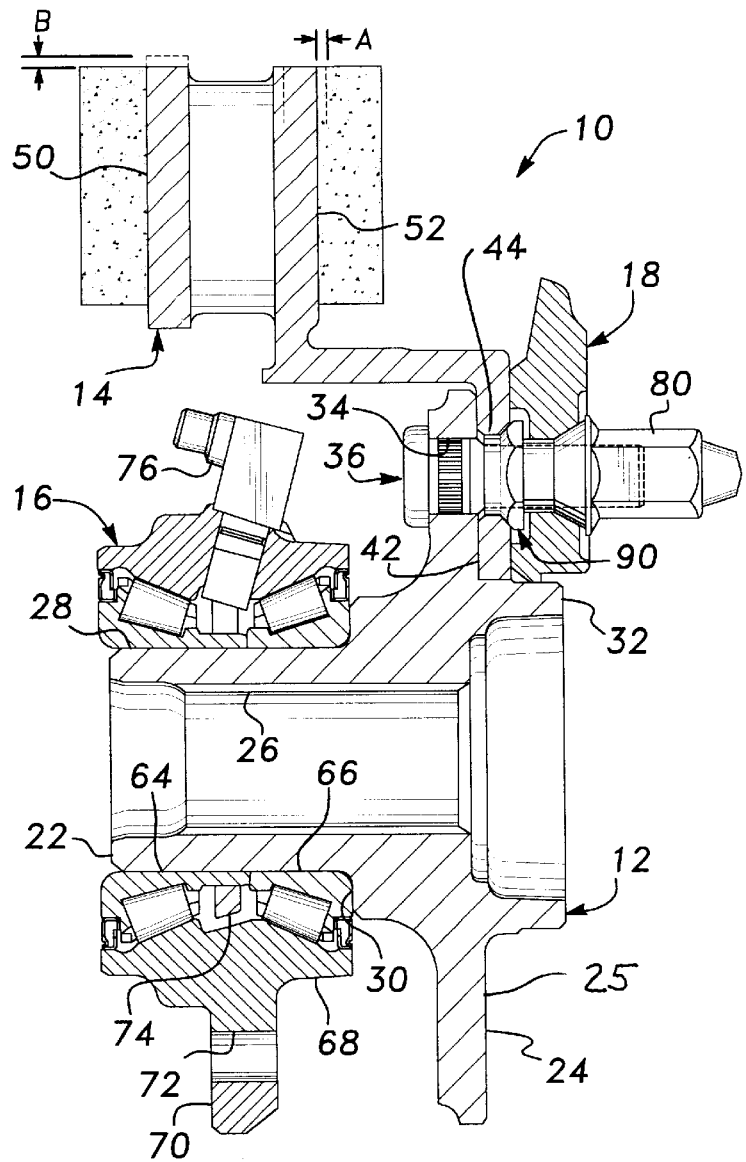
FIG. 1 is a cross-sectional view through a wheel end assembly accordingly to this invention further illustrating a portion of a wheel mounted to the assembly and a cartridge type bearing assembly pressed onto the hub.
Figure 2:
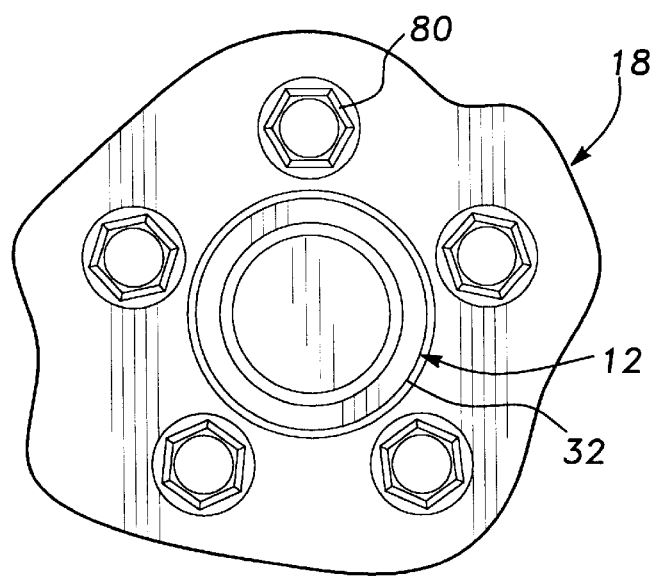
FIG. 2 is a partial front elevational view of the assembly shown in FIG. 1.
Figure 5:
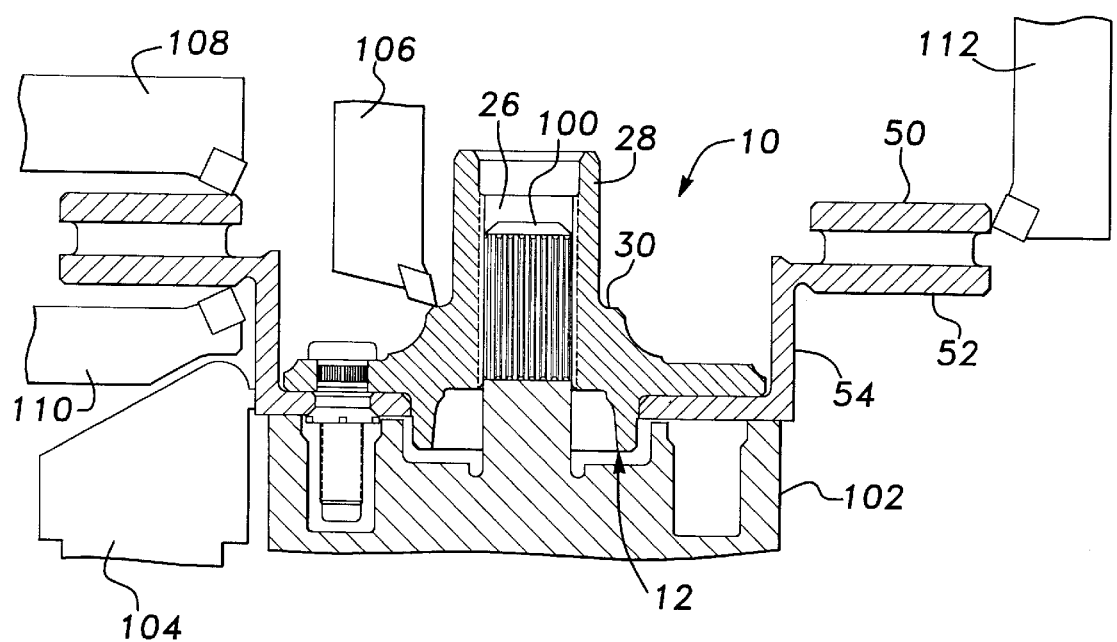
FIG. 5 is a cross-sectional view of a brake rotor and hub assembly illustrating the machining of the braking surfaces and the hub datum surfaces concurrently or consistently with the assembly mounted to a common work holding tool.

With reference to FIGS. 1, 2 and 3 wheel end assembly 10 according to this invention is shown which generally comprises hub 12 and brake rotor 14. FIG. 1 further illustrates cartridge type wheel bearing assembly 16 mounted to hub 12, and wheel 18 mounted against rotor 14.

Hub 12 includes a generally cylindrical barrel section 22 having a cylindrical outer diameter 28 and a radial protruding rotor mounting flange 24 which is generally circular and has an outboard surface 25. Through the center of hub 12 is a splined inner diameter 26. Splined inner diameter 26 receives a splined drive shaft (not shown) which drives wheel end assembly 10. The embodiment of wheel end assembly 10 shown in FIG. 1 is intended to be used with a driven and non-driven axles such as the front axle of a four wheel drive sport utility and passenger vehicles. Projecting from the outboard face of hub 12 is a protruding shoulder or circular post 32. Flange 24 forms a number of wheel mounting bolt bores 34 which receive wheel mounting bolts 36.

Brake rotor 14 includes a generally circular mounting flange 42 which forms a plurality of bolt clearance holes 44 which are in registry with wheel mounting bolt bores 34. Rotor flange 42 defines an inboard surface 43 and an opposed outboard surface 45 (FIG. 4). Rotor flange 42 forms an inside diameter 46 which fits closely onto the outside diameter of hub post 32. In accordance with a principal feature of this invention, brake rotor bolt clearance holes 44 include a tapered counter bore 48 segment opening to the outboard surface 45 of the rotor mounting flange. Rotor 14 further forms a pair of opposed braking friction surfaces 50 and 52. As shown in FIG. 1, dimension A depicts the lateral run-out of braking surface 52 as it is rotated. The extreme lateral positions which the braking surface occupies in the sectional view as it is rotated provides this run-out measure and is generally measured by a dial indicator with its probe touching the braking surface as the rotor is rotated. A similar measurement can be made of braking surface 50. The radial run-out is designated by dimension B which is the extreme radial positions which braking surface 50 occupies as it is rotated and is generally measured by a dial indicator with its probe touching the outer edge of the braking surface. A similar measurement can be made of braking surface 52. As mentioned previously, a principal feature of this invention to limit to extremely small values, both of these run-out characteristics for both braking surfaces.

Hub 12 and rotor 14 are rotationally symmetrical. Each component defines a center longitudinal axis. Ideally these axes should be co-axial.

Wheel mounting bolts 36 have a head 56 (FIG. 4) and a splined or knurled section 58. Splined section 58 is dimensioned such that wheel mounting bolts 36 are press-fit into rotor bolt bores 34. The threaded section 60 of wheel mounting bolts 36 extends from splined section 58 to the terminal end of the bolts and protrudes from the outboard surface 25 of the hub mounting flange 24.

Cartridge wheel bearing assembly 16 includes a pair of tapered roller bearing assemblies. Inner races 64 and 66 are press-fit onto hub barrel section outside diameter 28 with the race 66 abutting shoulder 30. Outer race 68 is a unitary assembly that forms the outer race surfaces for both sets of tapered roller bearings and includes flange 70 and bore 72 enabling it to be mounted to a suspension component of the vehicle. Cartridge wheel bearing assembly 16 also includes toothed tone wheel 74 which provides a signal for wheel speed sensor 76 related to wheel speed. These components are used as part of a vehicle anti-lock brake system or traction control system.

Vehicle wheel 18 is shown in partial section and being mounted against rotor mounting flange 42 through tightening of lug nut 80 which threads onto the threaded portion 60 of wheel mounting bolts 36. Lug nuts 80 feature a conical shoulder 82 which engage a conical counter bore 83 of the wheel bolt bores 84. The inboard side of the wheel surrounding wheel bolt bores 84 includes a counter bore 86 which provides clearance for retention nut 90.

Retention nut 90 includes an internally threaded bore 92 which meshes with the threaded portion 60 of wheel mounting bolts 36, and further includes a generally conical shoulder 94. In the embodiments shown in FIGS. 1 through 4, nut 90 further includes hexagonal driving surfaces 96. The cone angles or shapes formed by conical shoulder 94 and rotor tapered counter bore 48 match. It should be noted that the shapes of shoulder 94 and counter bore 48 do not have to be truly conical in shape. A variety of generally convex shapes would be useful for forming shoulder 94 and are considered within the definition of conical as used herein. Similarly, a ranges of shapes could be used for counter bore 48 which are generally concave. The nut 90 and rotor 14 thus define an interface means comprising the mating conical surfaces which provide for fixing of the relative angular position of the hub and rotor and center to center alignment between these components.

FIG. 3A illustrates a modified embodiment of nut 90 in which the cylindrical extension of nut 90 has been removed. This embodiment provides a lower profile configuration which may be desired where tight packaging constraints exist. Elements of retention nut 90A similar to those of retention 90 are identified in FIG. 3A with the suffix "A" added.

In a preferred manufacturing process, rotor 14 is placed onto hub 12 with wheel mounting bolts 36 pressed into position. A number of retention nuts 90 are threaded onto bolts 36. In some instances, retention nuts 90 may not be required for each wheel mounting bolt which are typically five or six in number. For example, three nuts 90 may provide adequate clamping and alignment. The action of threading retention nuts 90 places a clamping load against the rotor and further accurately positions these two parts both radially (ie. center-to-center) and rotationally. Retention nuts 90 are left in position until the assembly is loaded onto the vehicle.

The hub and rotor assembly is machined by mounting the assembly 10 in a machine tool having a work holding tool such as a expanding arbor 100 which is received within the splined or unsplined inner diameter bore 26 of the hub. The expanding arbor radially locates the assembly on the minor diameter of the internal involute splined of the hub. The machine tool includes a part locator 102 against which the outboard surface 45 of the rotor mounting flange rests. A compensating chuck 104 grips the assembly on the outside diameter of the rotor hat section 54. The compensating chuck pulls the rotor down onto locator 102 and is also used to rotate the assembly 10. The outside diameter 28 of the hub barrel is precision machined along with the shoulder 30, forming the hub bearing journal and bearing seat. This is shown by a representative tool, a single point tool 106. However, other tools, such as an abrasive wheel can be utilized as required to precision machine the surfaces 28 and 30. With the assembly 10 still mounted in the arbor 100, additional tools 108 and 110 machine the surfaces 50 and 52 to control lateral run-out. Preferably a straddle cut is preformed. A tool 112 is used to cut the radially outer edge of the braking surfaces 50 and 52 to control the radial run-out as described above.

The sequencing of the various machining operations is accomplished to minimize the variation due to unequal machine stock and tool loads to minimize variation with respect to the bearing journal. By machining the bearing journal and seat together with the brake friction surfaces while the assembly is held in a single work holding tool, the lateral run-out and radial run-out of the braking surfaces can be minimized. Subsequent checking of the part for tolerance validation utilizes the bearing journal and seat as datums.

The machining method has been described in the context of a two-piece hub and rotor assembly. The machining method is most beneficial in this context as the assembly of two components brings greater variation which must be compensated for by precision machining. The method can be used equally as well with a single piece cast hub and rotor to insure the accuracy of the location of the brake friction surfaces relative to the bearing journal. The seat method can also be used with a drum brake and hub and can also be used when the inside diameter of the hub is the bearing journal It is to be understood that the invention is not limited to the exact construction illustrated and described above, but that various changes and modifications may be made without departing from the spirit and scope of the invention as defined in the following claims.

We claim:

1. A process of manufacturing a wheel hub and brake component comprising the steps of:
   providing a wheel hub having a barrel section with a generally cylindrical outer surface and center bore with an inner surface, the hub further having a radially extending mounting flange with an outboard surface and a plurality of wheel mounting bolts extending through the mounting flange with threaded portions protruding from the outboard surface of the mounting flange, the brake component having at least one braking surface which is fixed in position relative to the wheel hub;
   mounting the wheel hub and brake component in a work holding tool;
   rotating the hub and the brake component; and
   simultaneous with the rotating step, machining the at least one braking surface of the brake component and machining a surface of the hub to form a cylindrical bearing journal and a radially extending shoulder forming a bearing seat whereby the location of the at least one braking surface relative to the bearing journal and seat is controlled.

2. The process of claim 1 wherein the brake component is a rotor having a pair of opposed braking friction surfaces each having a radially outer surface and, during the machining operation, the pair of opposed braking friction surfaces are straddle cut.

3. The process of claim 2 further comprising the step of machining the radially outer edge of each of the opposed braking friction surfaces.

4. The process of claim 1 wherein the hub is mounted on a work holding tool inserted into the hub center bore and the outer surface of the hub barrel is machined to form the bearing journal and seat.

5. A process of manufacturing a wheel hub and brake component assembly comprising the steps of:
   providing a wheel hub having a barrel section with a generally cylindrical outer surface and center bore with an inner surface, the hub further having a radially extending mounting flange with an outboard surface and a plurality of wheel mounting bolts extending through the mounting flange with threaded portions protruding from the outboard surface of the mounting flange;
   providing a brake component having at lease one braking friction surface and a generally circular mounting flange having opposed inboard and outboard surfaces, the brake component mounting flange further having a plurality of bolt clearance bores;
   placing the brake component onto the hub such that the brake component mounting flange inboard surface engages the hub mounting flange outboard surface and the brake component bolt clearance bores receive the wheel mounting bolts therethrough;
   securing the brake component to the wheel hub and fixing the relative angular position and center to center alignment of the hub and brake component;
   mounting the wheel hub and brake component in a work holding tool;
   rotating the hub and the brake component as an assembly, and
   simultaneous with the rotating step, machining the at least one braking friction surface of the brake component and machining a surface of the hub to form a cylindrical bearing journal and a radially extending shoulder forming a bearing seat whereby the location of the at least one braking friction surface relative to the bearing journal and seat is controlled.

6. The process of claim 5 wherein the brake component is a rotor having a pair of opposed braking friction surfaces each having a radially outer surface and, during the machining operation, the pair of opposed braking friction surfaces are straddle cut.

7. The process of claim 6 further comprising the step of machining the radially outer edge of each of the opposed braking friction surfaces.

8. The process of claim 5 wherein the hub is mounted on a work holding tool inserted into the hub center bore and the outer surface of the hub barrel is machined to form the bearing journal and seat.

9. The process of claim 5 wherein the step of securing the brake component to the wheel hub is accomplished by threading nuts onto at least a portion of the wheel mounting bolts and applying a clamping load on the hub and brake component mounting flanges.

10. A process of manufacturing a wheel hub and brake rotor assembly comprising the steps of:

provid1ng a wheel hub having a barrel section with a generally cylindrical outer surface and center bore with an inner surface, the hub further having a radially extending mounting flange with an outboard surface and a plurality of wheel mounting bolts extending through the mounting flange with threaded portions protruding from the outboard surface of the mounting flange;

providing a brake rotor having a pair of opposed braking friction surfaces and a generally circular mounting flange having opposed inboard and outboard surfaces, the rotor mounting flange further having a plurality of bolt clearance bores;

placing the brake rotor onto the hub such that the brake rotor mounting flange inboard surface engages the hub mounting flange outboard surface and the brake rotor bolt clearance bores receive the wheel mounting bolts therethrough;

securing the brake rotor to the wheel hub and fixing the relative angular position and center to center alignment of the hub and brake rotor;

mounting the wheel hub and brake rotor in a work holding tool;

rotating the hub and the brake rotor as an assembly, and simultaneous with the rotating step, machining the pair of opposed braking friction surfaces of the brake rotor and machining a surface of the hub to form a cylindrical bearing journal and a radially extending shoulder forming a bearing seat whereby the location of the braking surfaces relative to the bearing journal and seat is controlled.

11. The process of claim 10 wherein the pair of opposed braking surfaces have radially outer surfaces and wherein the machining step includes machining the radially outer edge of each of the opposed braking friction surfaces.

12. The process of claim 10 wherein the hub is mounted on a work holding tool inserted into the hub center bore and the outer surface of the hub barrel is machined to form the bearing journal and seat.

13. The process of claim 10 wherein the step of securing the brake component to the wheel hub is accomplished by threading nuts onto at least a portion of the wheel mounting bolts and applying a clamping load on the hub and brake component mounting flanges.

14. The process of claim 10 wherein the step of machining the opposed brake friction surfaces is accomplished by straddle cutting.

* * * * *